United States Patent
Lee et al.

(10) Patent No.: US 7,968,881 B2
(45) Date of Patent: Jun. 28, 2011

(54) THIN FILM TRANSISTOR SUBSTRATE AND DISPLAY DEVICE HAVING ELECTRODE PLATES ON STORAGE CAPACITORS

(75) Inventors: Jae Kyeong Lee, Yongin (KR); Hyo Taek Lim, Cheonan (KR); Young Goo Song, Cheonan (KR); Sahng Ik Jun, Yongin (KR); Ja Hee Woo, Cheonan (KR)

(73) Assignee: Samsung Electronics Co., Ltd. (KR)

( * ) Notice: Subject to any disclaimer, the term of this patent is extended or adjusted under 35 U.S.C. 154(b) by 61 days.

(21) Appl. No.: 11/945,067

(22) Filed: Nov. 26, 2007

(65) Prior Publication Data

US 2008/0210940 A1 Sep. 4, 2008

(30) Foreign Application Priority Data

Nov. 30, 2006 (KR) ........................ 10-2006-0119838

(51) Int. Cl.
*H01L 29/04* (2006.01)
*H01L 29/10* (2006.01)
*H01L 21/00* (2006.01)
*G02F 1/1343* (2006.01)

(52) U.S. Cl. .......... 257/59; 438/149; 349/139; 349/143; 349/144; 349/145; 349/146; 349/147; 349/148

(58) Field of Classification Search .................. 438/149; 349/38, 48, 143

See application file for complete search history.

(56) References Cited

U.S. PATENT DOCUMENTS 5,701,166 A * 12/1997 Fedorovish et al. ............ 349/38
2006/0098150 A1 * 5/2006 Lee et al. ...................... 349/141
2006/0158576 A1 * 7/2006 Kim et al. ........................ 349/38
2006/0164352 A1 7/2006 Yoo et al.
2006/0203172 A1 * 9/2006 Baek et al. ..................... 349/146
2006/0231838 A1 10/2006 Kim et al.
2006/0274009 A1 * 12/2006 Lee ................. 345/92
2008/0204613 A1 * 8/2008 Kim et al. ....................... 349/33

FOREIGN PATENT DOCUMENTS

CN 1627160 A 6/2005

(Continued)

OTHER PUBLICATIONS http://www.merriam-webster.com/dictionary/overlap ; accessed Nov. 4, 2009.*

*Primary Examiner* — N Drew Richards
*Assistant Examiner* — Michael Jung
(74) *Attorney, Agent, or Firm* — Innovation Counsel LLP

(57) ABSTRACT

The invention relates to a thin film transistor substrate and a display device including the same, and provides a thin film transistor substrate and a display device including the same, which can prevent damage of elements due to static electricity by forming, in each unit pixel region where a pair of first and second pixel electrodes, a pair of first and second drain electrode plates that are connected to the first and second pixel electrodes and to connected to drain terminals of thin film transistors, and can obtain a dot inversion driving effect through line inversion driving by connecting the first drain electrode in one pixel region to the first drain electrode plate, connecting the second drain electrode in the one unit pixel region to the second drain electrode plate, connecting a first drain electrode in another unit pixel region neighboring the one unit pixel region to the second drain electrode plate, and connecting a second drain electrode in another unit pixel region to the first drain electrode plate.

17 Claims, 13 Drawing Sheets

FOREIGN PATENT DOCUMENTS

| | | |
|---|---|---|
| CN | 1847964 A | 10/2006 |
| EP | 1383105 A2 | 1/2004 |
| EP | 1674922 A1 | 6/2006 |
| EP | 1798591 A1 | 6/2007 |
| WO | WO 2004/086129 A1 * | 10/2004 |
| WO | 2006038598 A1 | 4/2006 |

* cited by examiner

THIN FILM TRANSISTOR SUBSTRATE AND DISPLAY DEVICE HAVING ELECTRODE PLATES ON STORAGE CAPACITORS

CROSS-REFERENCE TO RELATED PATENT APPLICATION

This application claims priority to Korean Patent Application No. 2006-0119838, filed on Nov. 30, 2006, in the Korean Intellectual Property Office, the disclosure of which is incorporated by reference herein.

BACKGROUND OF THE INVENTION

1. Field of the Invention

The present invention relates to a thin film transistor substrate and a display device therefore and, more particularly, to preventing display aberrations.

2. Discussion of the Background

A liquid crystal display device is a kind of flat display device that displays images by using the optical anisotropic and polarizable properties of liquid crystal. That is, the liquid crystal display device controls the transmittance of light by controlling the orientation of the liquid crystal molecules.

Liquid crystal display devices tend to produce ghost images during the display of moving pictures.

It has been proposed to increase the frame frequency for driving the liquid crystal display device to a frequency higher than 60 Hz. In order to drive a liquid crystal display device at a frequency higher than 60 Hz, the internal pixel structure of the liquid crystal display device needs to be changed. That is, in the related art, the operation of the pixel is controlled through one gate line and one data line. However, as described above, in order to drive the liquid crystal display device at a frequency higher than 60 Hz, a plurality of sub-pixels are provided in the pixel region, and the sub-pixels are controlled through a plurality of gate lines and data lines. However, because this may have the effect of reducing the charging rate of each pixel, a vertical line stain may be generated, or a malfunction due to static electricity may occur.

SUMMARY OF THE INVENTION

According to one aspect of the invention, dot inversion is obtained through alternate driving in which pixel voltages having different polarities are applied to sub-pixel electrodes in neighboring pixel regions. Malfunction of elements due to static electricity is prevented by increasing the pixel contact areas of the drain electrodes connected to the plurality of sub-pixel electrodes formed in a pixel region.

An exemplary embodiment of the invention comprises a thin film transistor substrate that includes: a plurality of gate lines; a plurality of first and second data lines intersecting the gate lines; a plurality of first and second thin film transistors formed in unit pixel regions each defined by a gate line, a first data line, and a second data line having first and second drain electrodes, respectively; a plurality of first and second pixel electrodes formed in the unit pixel regions; a plurality of first drain electrode plates each of which is connected to the first pixel electrode and one of the first and second drain electrodes included in the unit pixel region; and a plurality of second drain electrode plates each of which is connected to the second pixel electrode and the other of the first and second drain electrodes included in the unit pixel region.

In the thin film transistor substrate, in each of the unit pixel regions, the first and second drain electrode plates are formed between extension portions of the first and second drain electrodes.

The center line connecting the centers of the first and second drain electrode plates in each unit pixel region intersects the gate lines.

The thin film transistor substrate may further include a plurality of storage electrode plates each of which partially overlaps the first and second electrode plates in each unit pixel region. In each unit pixel region, the storage electrode plate is formed between the extension portions of the first and second drain electrodes.

In a pixel region, the first drain electrode is connected to the first drain electrode plate and the second drain electrode is connected to the second drain electrode plate. In another unit pixel region adjacent to the one unit pixel region, the first drain electrode is connected to the second drain electrode plate, and the second drain electrode is connected to the first drain electrode plate. The first thin film transistor is connected to the gate line and the first data line and the second thin film transistor be connected to the gate line and the second data line.

An exemplary embodiment of the invention comprises a display device that includes: a plurality unit pixels each of which includes a first pixel capacitor having a first pixel electrode and a common electrode and a second pixel capacitor having a second pixel electrode and the common electrode; a plurality of first and second thin film transistors formed in the unit pixels, the first thin film transistor having a first drain electrode and the second thin film transistor having a second drain electrode; a plurality of first drain electrode plates each of which is connected to the first pixel electrode and one of the first and second drain electrodes in the unit pixel; and a plurality of second drain electrode plates each of which is connected to the second pixel electrode and the other of the first and second drain electrodes in the unit pixel. In each of the unit pixels, the first and second drain electrode plates are formed between extension portions of the first drain electrode and the second drain electrode.

The first and second thin film transistors in each of the unit pixels are connected to one of the gate lines, the first thin film transistor is connected to the first data line, and the second thin film transistor is connected to the second data line. Also, in each of the unit pixels, a center line connecting the centers of the first and second drain electrodes intersects the gate lines.

Each of the plurality of storage electrode plates partially overlaps the first and second drain electrodes in the corresponding unit pixel so as to form first and second storage capacitors.

In a pixel region, the first drain electrode is connected to the first drain electrode plate and the second drain electrode is connected to the second drain electrode plate. In an adjacent pixel region, the first drain electrode is connected to the second drain electrode plate and the second drain electrode is connected to the first drain electrode plate.

An exemplary display device includes: a plurality of gate lines; a plurality of first and second data lines; and a plurality of unit pixels each of which is formed along a gate line, a first data line, and a second data line, and includes a first pixel capacitor having a first pixel electrode and a common electrode, a second pixel capacitor having a second pixel electrode and the common electrode, a first storage capacitor having the first pixel electrode and a storage electrode plate, and a second storage capacitor having the second pixel electrode and the storage electrode plate. In this display device, an extension line of the storage electrode plate extending in a major axis direction intersects the gate lines.

The first storage capacitor is formed between the first pixel electrode and the storage electrode plate and further includes a first drain electrode plate connected to the first pixel electrode, and the second storage capacitor is formed between the second pixel electrode and the storage electrode plate and further includes a second drain electrode plate connected to the second pixel electrode.

The display device may further include a plurality of first thin film transistors each having a first drain electrode and a plurality of second thin film transistors each having a second drain electrode. In each of the unit pixels, a portion of the first drain electrode extends to be connected to one of the first and second drain electrode plates, a portion of the second drain electrode extends to be connected to the other of the first and second drain electrode plates, and the first and second drain electrodes are formed between the extension portions of the first and second drain electrodes.

In one pixel region, the first drain electrode is connected to the first drain electrode plate and the second drain electrode is connected to the second drain electrode plate. In an adjacent pixel region, the first drain electrode is connected to the second drain electrode plate and the second drain electrode is connected to the first drain electrode plate.

An exemplary method of manufacturing a display device, comprises: forming, on a transparent substrate, a plurality of gate lines, a plurality of first and second gate electrodes, and a plurality of storage electrode plates whose extension lines in the major axis directions intersect the gate lines; forming a gate insulting film on the entire structure; forming an active layer on the first and second gate electrodes; forming a plurality of first and second data lines intersecting the gate lines, forming a plurality of first source electrodes and a plurality of first drain electrodes on the first gate electrodes, forming a plurality of second source electrodes and a plurality of second drain electrodes on the second gate electrodes, and forming a plurality of first and second drain electrode plates on the storage electrode plates such that the first drain electrode plate is connected to one of the first and second drain electrodes, the second drain electrode plate is connected to the other of the first and second drain electrodes, wherein a center line connecting the centers of the first and second drain electrode plates intersects the gate lines; forming, on the entire structure, a protection film including a plurality first pixel contact holes exposing portions of the first drain electrode plates and a plurality of second pixel contact holes exposing portions of the second drain electrode plates; and forming, on the protection film, a plurality of first pixel electrodes connected to the first drain electrode plates through the first pixel contact holes and a plurality of second pixel electrodes connected to the second drain electrode plates through the second pixel contact holes.

An exemplary thin film transistor substrate includes: a plurality of gate lines; a plurality of first and second data lines intersecting the gate lines; a plurality of first and second thin film transistors formed in unit pixel regions each defined by a gate line, a first data line, and a second data line, the first and second transistors having first and second drain electrodes, respectively; a plurality of first and second pixel electrodes formed in the unit pixel regions; a plurality of first drain electrode plates each of which is connected to the first pixel electrode and one of the first drain electrode and the second drain electrode in the unit pixel region; and a plurality of second drain electrode plates each of which is connected to the second pixel electrode and the other of the first drain electrode and the second drain electrode included in the unit pixel region. In each of the unit pixel regions, the first and second drain electrode plates are formed between extension portions of the first and second drain electrodes and a center line connecting the centers of the first and second drain electrodes intersects the gate lines.

In each of the unit pixel region, the first and second drain electrodes are disposed in a vertical direction.

In one unit pixel region, the first drain electrode is connected to the first drain electrode plate and the second drain electrode is connected to the second drain electrode plate. In an adjacent pixel region, the first drain electrode is connected to the second drain electrode plate and the second drain electrode is connected to the first drain electrode plate.

The thin film transistor substrate may further include a plurality of storage electrode plates each of which extends in a vertical direction to partially overlap the first and second drain electrode plates in each unit pixel region.

Figure 1:
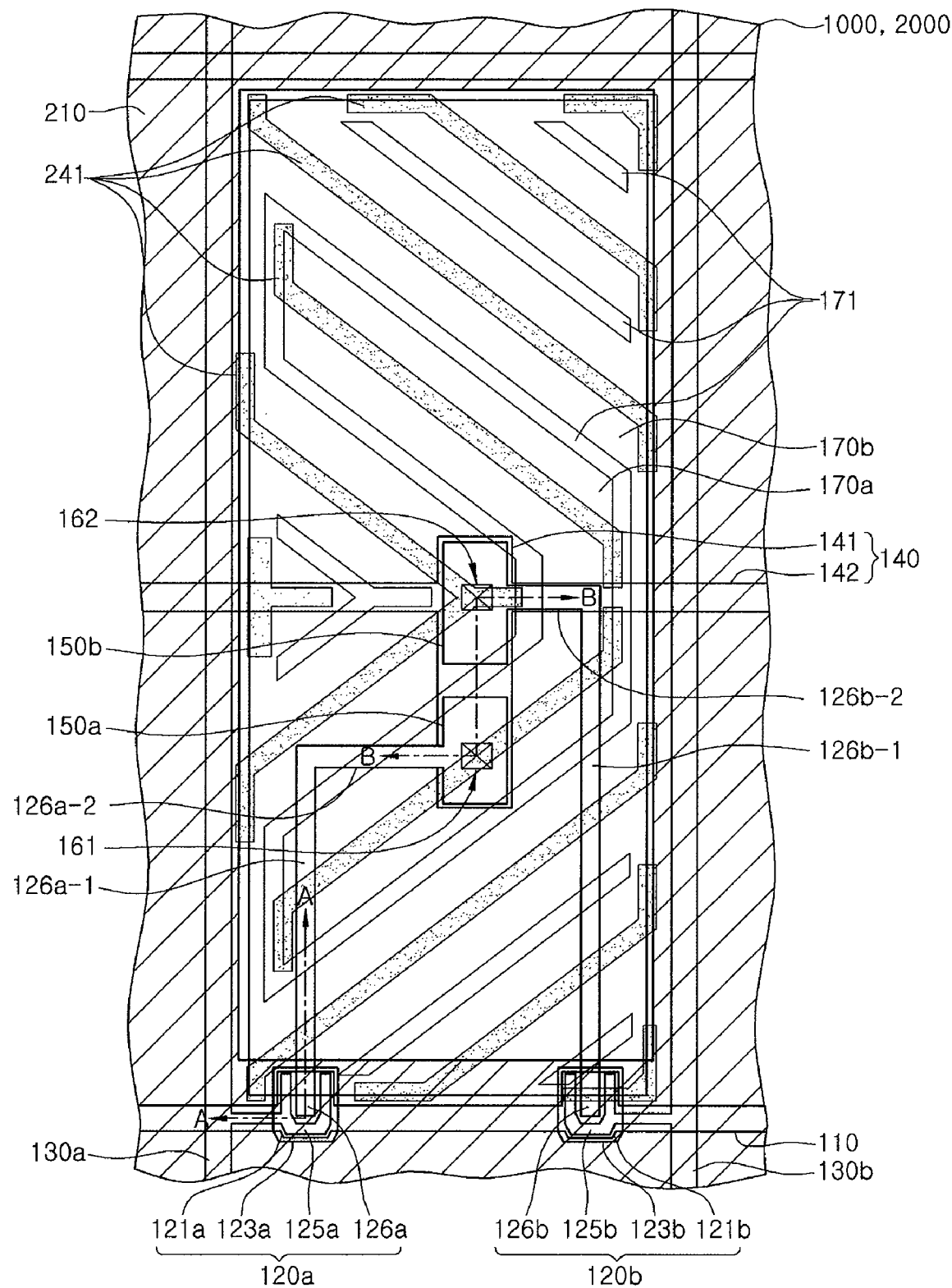
FIG. 1 is a schematic plan view of a display device according to an exemplary embodiment of the invention.

DESCRIPTION OF THE PREFERRED
EXEMPLARY EMBODIMENTS

In the drawings, the thickness of layers, films, panels, regions, etc. are exaggerated for clarity and the same reference symbols designate the same elements. Also, when an element such as a layer, film, region or substrate is referred to as being "on" another element, it can be directly on the other element or intervening elements may also be present therebetween.

Figure 2:
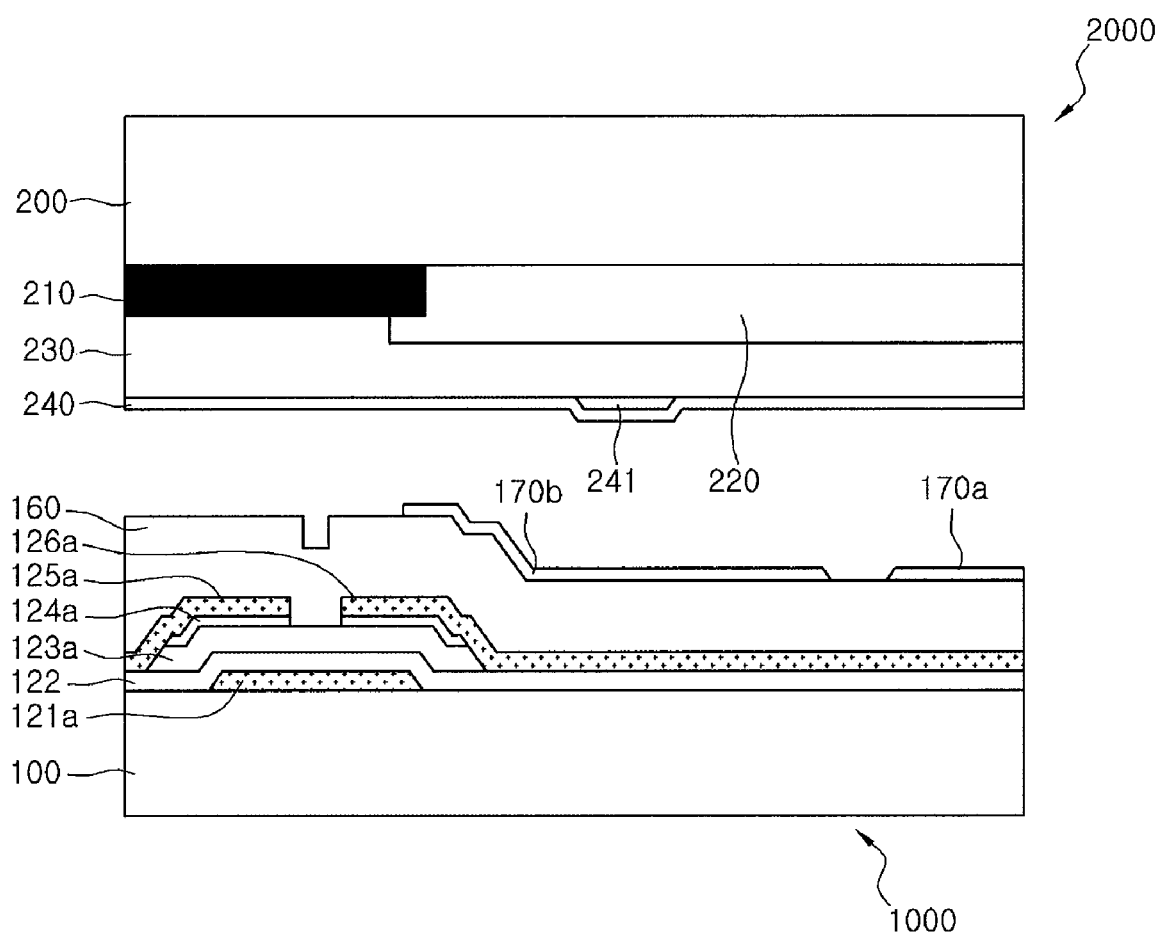
FIGS. 2 and 3 are schematic cross-sectional views taken along the line A-A of FIG. 1.
Figure 3:
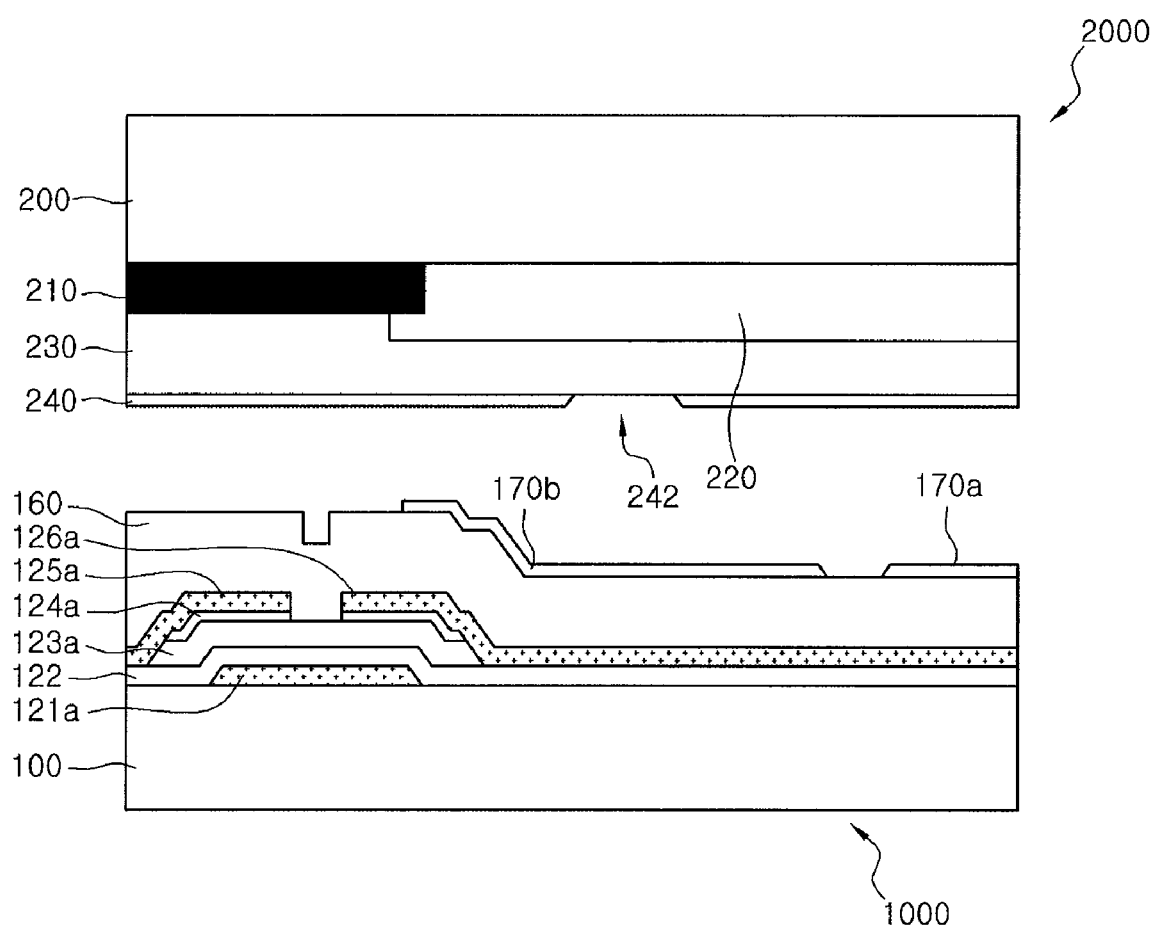
Figure 4:
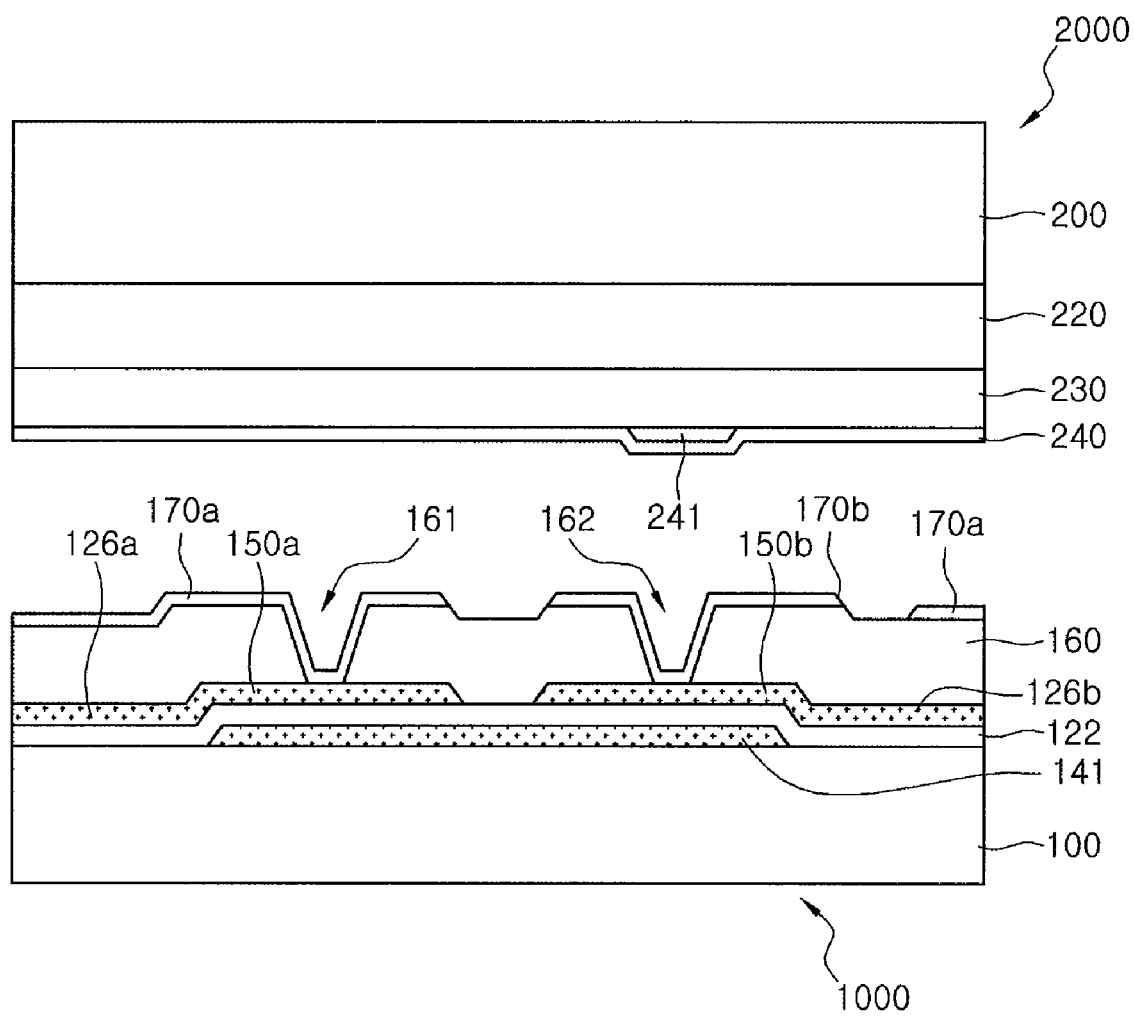
FIGS. 4 and 5 are schematic cross-sectional views taken along the line B-B of FIG. 1.
Figure 5:
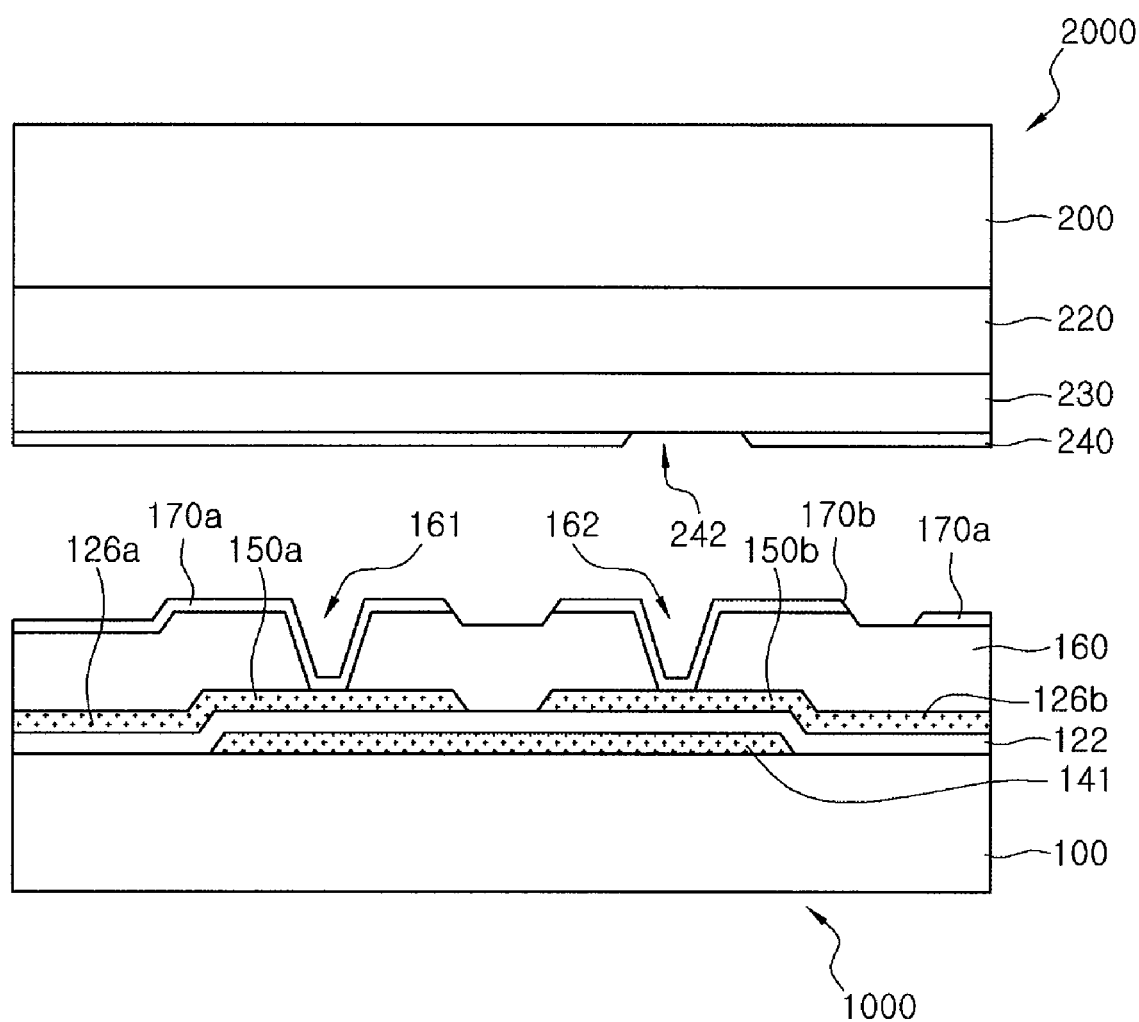
Figure 6:
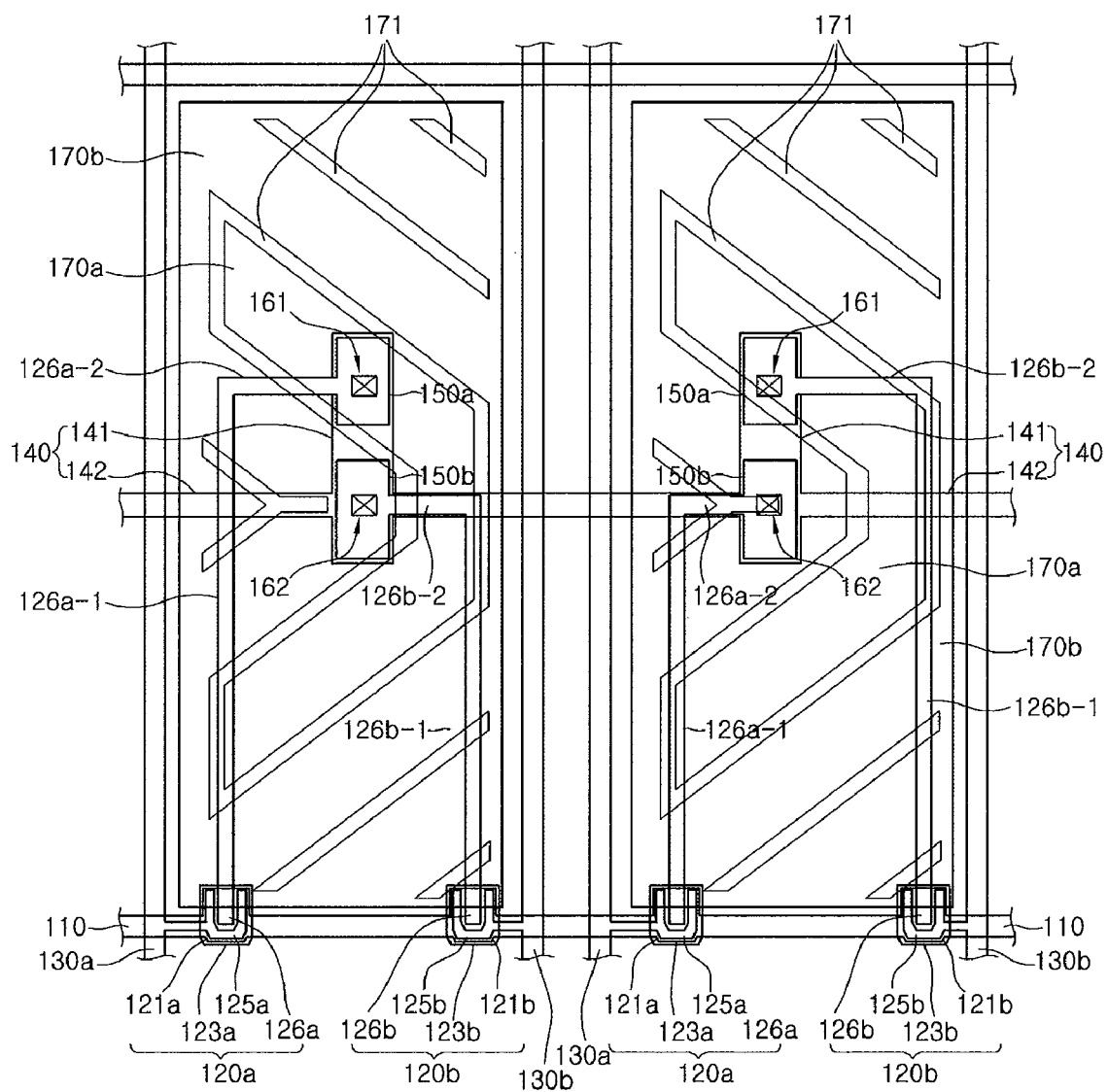
FIG. 6 is a schematic plan view of a thin film transistor substrate for alternate driving according to an exemplary embodiment of the invention.
Figure 7:
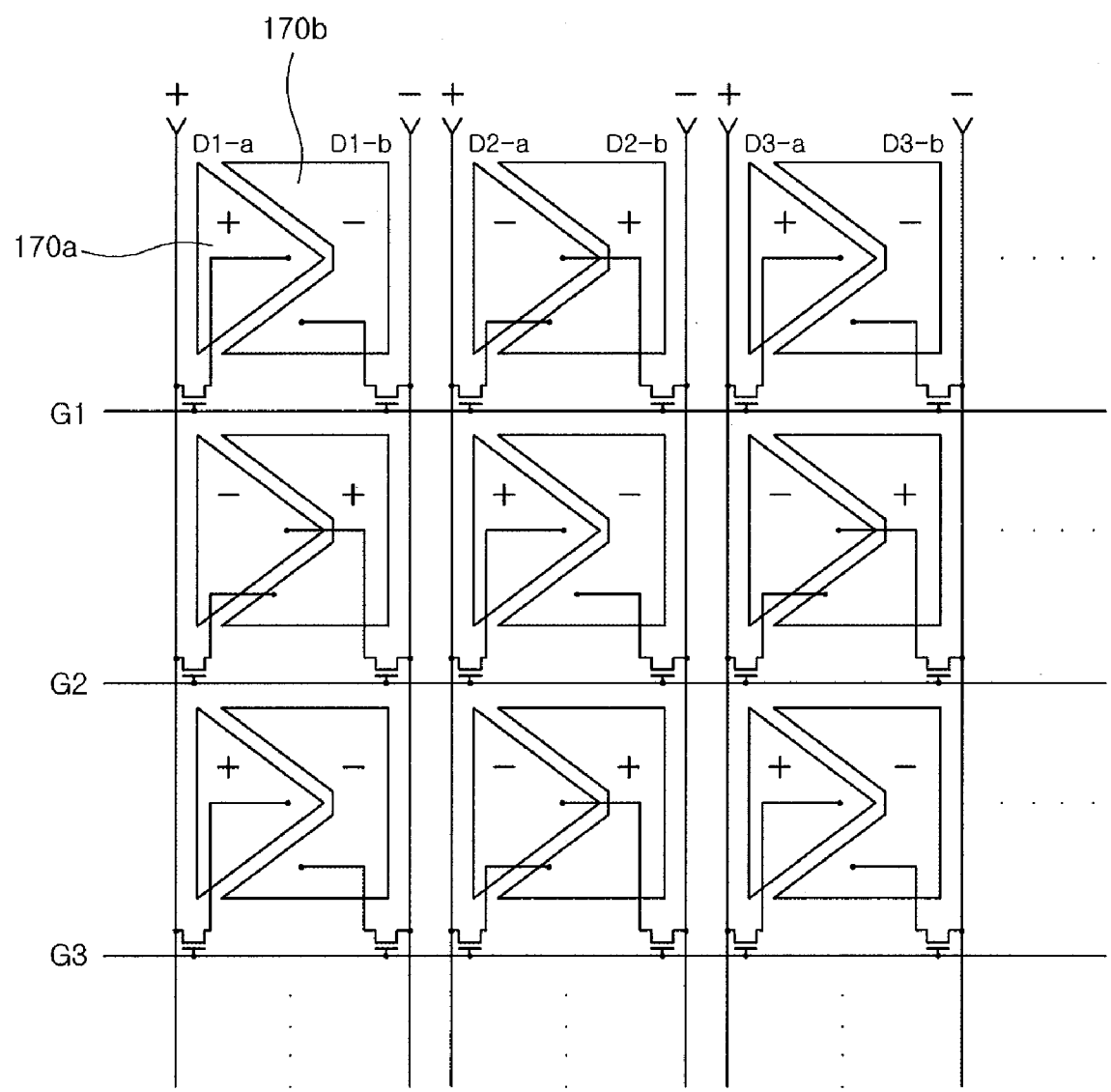
FIG. 7 is a schematic view for explaining the alternate driving of the display apparatus according to the exemplary embodiment.
Figure 8:
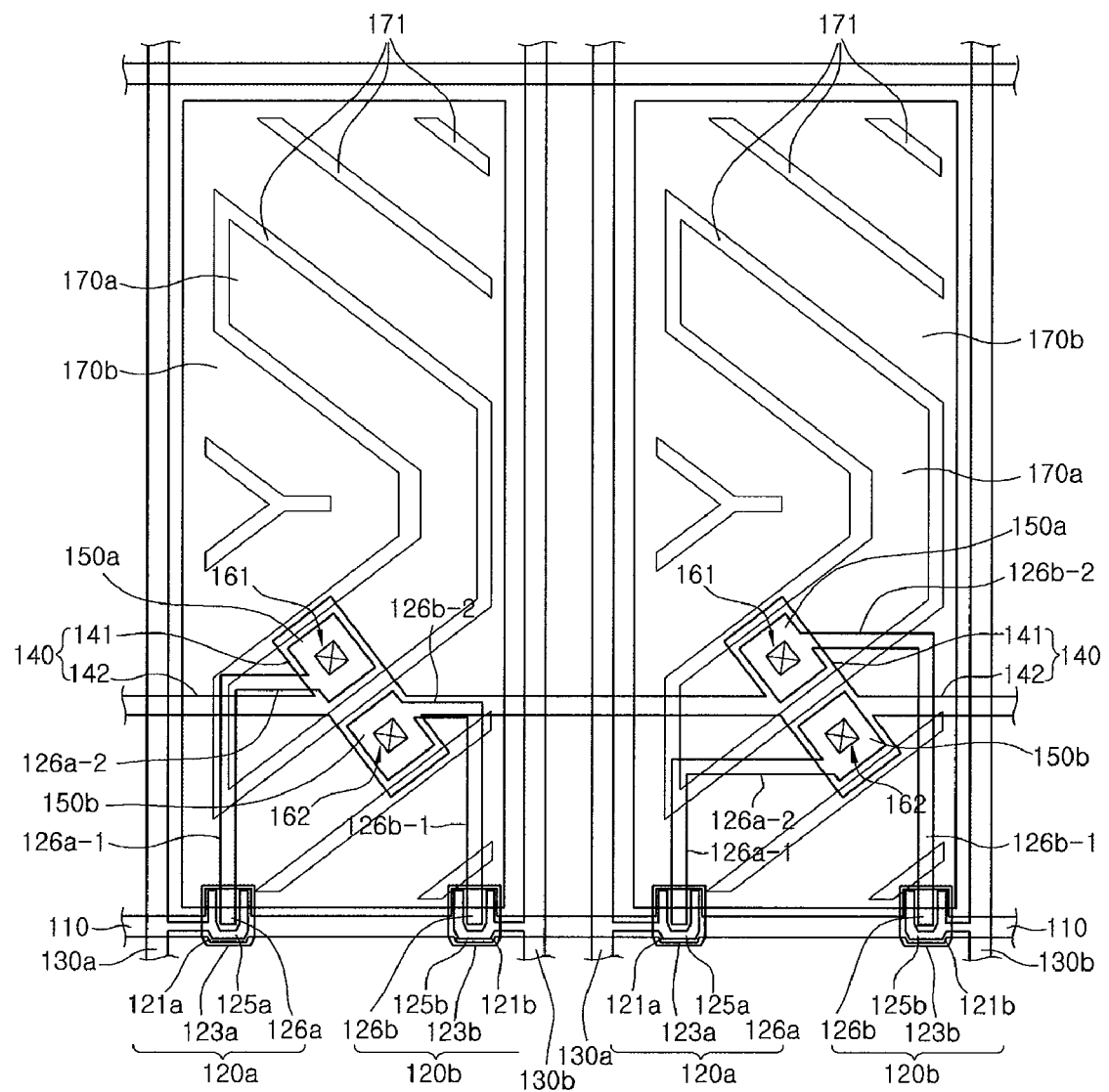
FIGS. 8 and 9 are schematic plan views of a thin film transistor substrate according to a modification of the invention.
Figure 9:
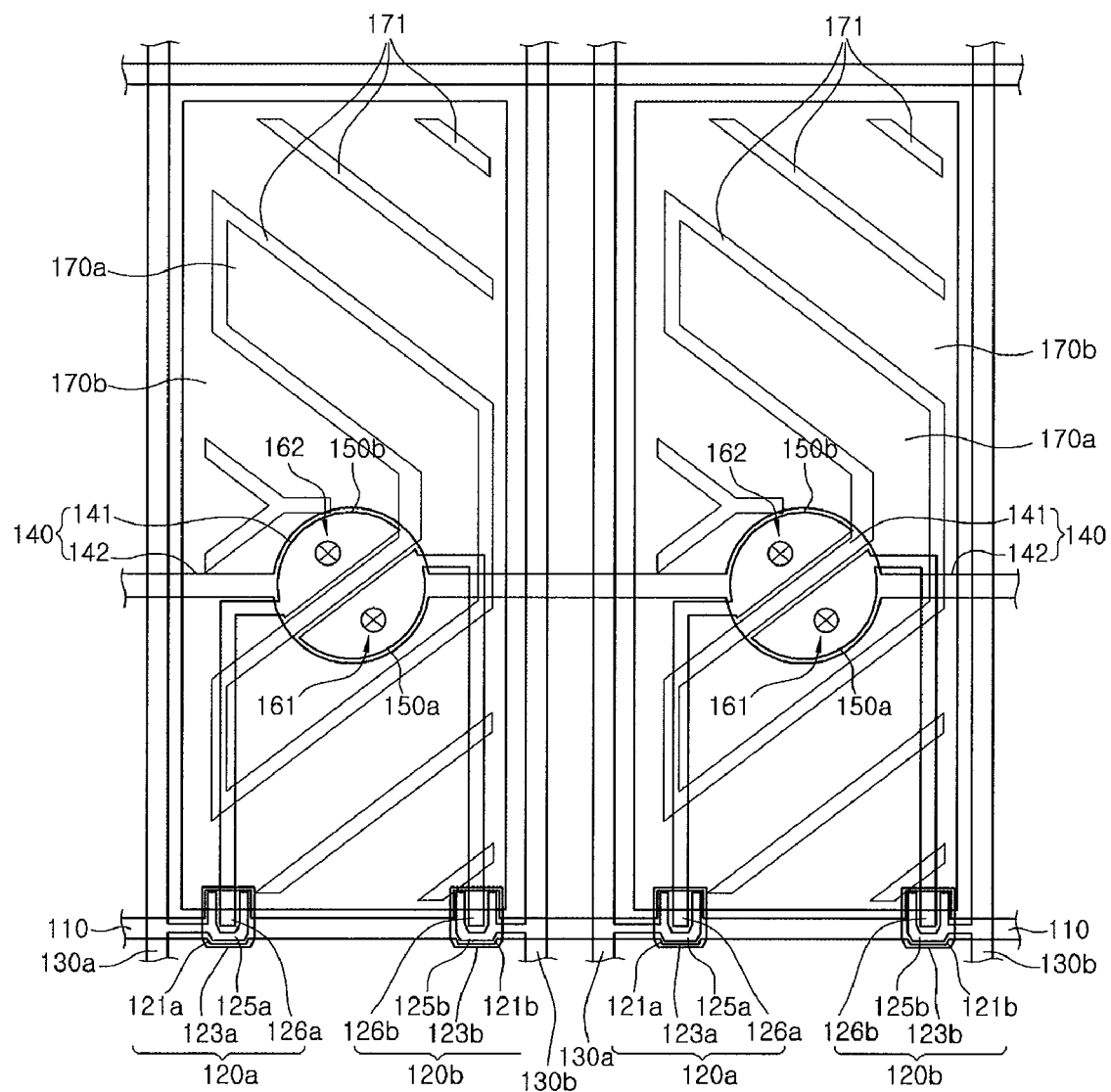

FIG. 1 is a schematic plan view of a display device according to an exemplary embodiment of the invention, FIGS. 2 and 3 are schematic cross-sectional views taken along the line A-A of FIG. 1, and FIGS. 4 and 5 are schematic cross-sectional views taken along the line B-B of FIG. 1. FIG. 6 is a schematic plan view of a thin film transistor substrate for alternate driving according to an exemplary embodiment of the invention, and FIG. 7 is a schematic view for explaining the alternate driving of the display apparatus according to the exemplary embodiment. FIGS. 8 and 9 are schematic plan views of a thin film transistor substrate according to a modification of the invention.

Referring to FIGS. 1 to 9, a display device according to an exemplary embodiment of the invention includes a thin film transistor substrate 1000, which is a lower substrate, a common electrode substrate 2000, which is an upper substrate disposed to face substrate 1000, and a liquid crystal layer (not shown) which is disposed between the two substrates and whose liquid crystal molecules are oriented in a desired direction with respect to the two substrates. On a surface of each of the upper and lower substrates, an alignment film (not shown)

is provided to align the liquid crystal molecules of the liquid crystal layer. It is preferable that the liquid crystal molecules of the liquid crystal layer be vertically aligned with respect to the substrates. However, the invention is not limited thereto.

The thin film transistor substrate 1000 includes a transmissive insulating substrate 100, and a plurality of gate lines 110, a plurality of first and second data lines 130a and 130b, a plurality of first and second pixel electrodes 170a and 170b, a plurality of first thin film transistors 120a, a plurality of second thin film transistors 120b, and a plurality of storage lines 140, which are provided on the transmissive insulating substrate 100. The gate lines 110 transmit gate signals and are arranged to extend in a first direction at predetermined intervals along a second direction. The first and second data lines 130a and 130b are formed to intersect the gate lines 110.

The first and second pixel electrodes 170a and 170b are formed in pixel regions defined by the gate lines 110 and the first and second data lines 130a and 130b. The first thin film transistors 120a are connected to the first data lines 130a and the gate lines 110, and the second thin film transistors 120b are connected to the second data lines 130b and the gate lines 110. The storage lines 140 extend in parallel to the gate lines 110 to pass through the first and second pixel electrodes 170a and 170b.

In each pixel region, each of the first thin film transistors 120a and the second thin film transistors 120b are connected to the first pixel electrode 170a or the second pixel electrode 170b. More specifically, in each pixel region, when the first thin film transistor 120a is connected to the first pixel electrode 170a, the second thin film transistor 120b is connected to the second pixel electrode 170b, and when the first thin film transistor 120a is connected to the second pixel electrode 170b, the second thin film transistor 120b is connected to the first pixel electrode 170a.

Each of the gate lines 110 extends substantially in a horizontal direction, and some portions of each of the gate lines 110 protrude upward and/or downward so as to form gate electrodes 121a and 121b of the above-mentioned first and second transistors 120a and 120b. At an end of each of the gate lines 110, a gate contact pad (not shown) for connection with an external circuit is formed. The gate lines 110 may be formed in a single-layered structure or a multi-layered structure of two or more layers. When the gate line 110 is formed in a multi-layered structure including two or more layers, it is preferable that one layer be formed of a low-resistance material and the other layers be formed of a material having good contact properties with other materials. Examples of the multi-layered structure include a two-layered structure of a Cr layer and an Al (or Al alloy) layer and a two-layered structure of an Al (or Al alloy) layer and a Mo layer. In addition, the gate lines 110 may be formed of any of various metals or conductive materials.

The first and second data lines 130a and 130b extend substantially in a vertical direction and form pairs. Between a pair of first and second data lines 130a and 130b, a part of the plurality of first and second pixel electrodes 170a and 170b are disposed. Some portions of each of the first data lines 130a protrude such that each protruding portion forms a source electrode 125a of a first thin film transistor 120a. Some portions of each of the second data lines 130b protrude such that each protruding portion forms a source electrode 125b of a second thin film transistor 120b. At an end of each of the first and second data lines 130a and 130b, a data contact pad (not shown) is formed. The first and second data lines 130a and 130b may be formed in a single-layered structure or a multi-layered structure of two or more layers having different physical properties.

When the first and second data lines 130a and 130b are formed in a multi-layered structure of two or more layers, it is preferable to form one layer of a low-resistance material in order to reduce delay of a data signal or a drop in voltage and to form the other layers of materials having good contact properties with other materials. Even though the first and second data lines 130a and 130b are shown in the shape of a straight line in the drawings, the first and second data lines 130a and 130b may have some bent portions. When the first and second data lines 130a and 130b have some bent portions, the first and second pixel electrodes 170a and 170b may be formed along the bent portions of the first and second data lines 130a and 130b.

Each of the storage lines 140 includes a plurality of storage electrode plates 141 that partially overlap the first and second pixel electrodes 170a and 170b and a storage electrode line 142 that is connected with the storage electrode plate 141 and extends in the same direction as the direction in which the gate lines 110 extend. The storage lines 140 are made of the same material as the gate lines 110 and are patterned together with the data lines 110 at the same time. Preferably, an end of each storage line 140 is connected to a common voltage source Vcom.

In a pixel region, from the inner surface of each of two gate electrodes 121a and 121b an extension line extends in the direction in which the corresponding gate electrode protrudes. The storage electrode plate 141 is preferably provided between the two extending lines to have substantially a rectangular shape. The storage electrode plate 141 is formed in a substantially rectangular shape whose longer side extends in a direction intersecting the extended direction of the storage electrode line 142 (that is, the direction in which the gate line 110 extends). In this case, it is preferable that the extended direction of the longer side of the storage electrode plate 141 be orthogonal to the extended direction of the storage electrode line 142. Further, it is preferable that the storage electrode plate 141 be disposed in the central portion of the pixel region. However, this exemplary embodiment is not limited thereto.

It is also possible that an extension line of the storage electrode plate 141 in the extended direction of the longer side of the storage electrode plate 141 and the extended direction of the storage electrode line 142 intersect at a predetermined angle as shown in FIG. 8. It is preferable that the predetermined angle be within the range of 0° to 90°. Also, the storage electrode plate 141 may be disposed in a region adjacent to the gate line 110 as shown in FIG. 8. Further, the storage electrode plate 141 may be formed in the shape of a circle as shown in FIG. 9. The storage electrode plate 141 can also be formed in, for example, the shape of a polygon, the shape of a semicircle, the shape of an ellipse, or the shape of a half ellipse, other than the shape of a circle.

As shown in FIG. 1, the upper portion of the storage electrode plate 141 partially overlaps the second pixel electrode 170b so as to form a second storage capacitor. Between the second pixel electrode 170b and the storage electrode plate 141, a second drain electrode plate 150b is provided to be connected to the second pixel electrode 170b through a second pixel contact hole 162. It is possible to increase the electrostatic capacity of the second storage capacitor through the second drain electrode plate 150b. Also, the lower portion of the storage electrode plate 141 partially overlaps the first pixel electrode 170a so as to form a first storage capacitor.

Between the first pixel electrode 170a and the storage electrode plate 141, a first drain electrode plate 150a is provided to be connected to the first pixel electrode 170a through a first pixel contact hole 161. It is possible to increase the electrostatic capacity of the first storage capacitor through the first drain electrode plate 150a. The electrostatic capacity of the first storage capacitor and the electrostatic capacity of the second storage capacitor can be controlled by adjusting the overlapping area of the first drain electrode plate 150a and the storage electrode plate 141 and the overlapping area of the second drain electrode plate 150b and the storage electrode plate 141.

As shown in FIG. 1, a portion of the first drain electrode plate 150a may extend to an area (a slit pattern region) separated from the first pixel electrode 170a so as to overlap the storage electrode plate 141, and a portion of the second drain electrode plate 150b may extend to a space separated from the second pixel electrode 170b so as to overlap the storage electrode plate 141. However, the invention is not limited thereto. As shown in FIG. 6, the upper portion of the storage electrode plate 141 may overlap the first pixel electrode 170a and the lower portion of the storage electrode plate 141 may overlap the second pixel electrode 170b.

The first thin film transistor 120a includes a first gate electrode 121a, a first source electrode 125a, and a first drain electrode 126a, and the second thin film transistor 120b includes a second gate electrode 121b, a second source electrode 125b, and a second drain electrode 126b. A portion of the first drain electrode 126a extends to be connected to the first drain electrode 150a, and a portion of the second drain electrode 126b extends to be connected to the second drain electrode 150b. The first and second source electrodes 125a and 125b, the first and second drain electrodes 126a and 126b, and the first and second drain electrode plates 150a and 150b are formed of the same material as the first and second data lines 130a and 130b and are patterned together with the first and second data lines 130a and 130b at the same time.

The first source electrode 125a is made by protruding a portion of the data line 130a such that the end of the protruding portion is positioned on the first gate electrode 121a. The second source electrode 125b is made by protruding a portion of the data line 130a such that the end of the protruding portion is positioned on the second gate electrode 121b.

The first drain electrode 126a extends from the upper side of the first gate electrode 121a to be connected to the first drain electrode plate 150a. As shown in FIG. 1, the first drain electrode 126a includes a first extending portion 126a-1 that is adjacent to the first data line 130a and extends in the same direction as the first data line 130a, and a second extending portion 126a-2 extending from the first extending portion 126a-1 toward the first drain electrode plate 150a. The second drain electrode 126b extends from the upper side of the second gate electrode 121b to be connected to the second drain electrode plate 150b. As shown in FIG. 1, the second drain electrode 126b includes a first extending portion 126b-1 that is adjacent to the second data line 130b and extends in the same direction as the second data line 130b, and a second extending portion 126b-2 extending from the first extending portion 126b-1 toward the second drain electrode plate 150b.

The first drain electrode plate 150a is formed in a plate shape underneath the first pixel electrode 170a, and the second drain electrode plate 150b is formed in a plate shape underneath the second pixel electrode 170b.

Preferably, the first and second drain electrode plates 150a and 150b are formed between the first extending portion 126a-1 of the first drain electrode 126a and a virtual extension line thereof, and the second extending portion 126b-1 of the second drain electrode 126b and a virtual extension line thereof. At this time, it is preferable that the second drain electrode plate 150b be positioned upside the first drain electrode plate 150a, as shown in FIG. 1. That is, it is preferable that a center line linking the centers of the first and second drain electrode plates 150a and 150b intersect the gate line 110. It is more preferable that the center line and the gate line 110 be perpendicular to each other, as shown in FIGS. 1 and 6. The center line may intersect the gate line 110 at a predetermined angle, as shown in FIGS. 8 and 9. This exemplary embodiment is not limited thereto.

As shown in FIGS. 6 and 8, the first drain electrode plate 150a may be positioned upside the second drain electrode plate 150b. Also, as shown in FIGS. 6, 8, and 9, in a pixel region, the first drain electrode 126a may be connected to the second drain electrode plate 150b, and the second drain electrode 126b may be connected to the first drain electrode plate 150a. In an adjacent pixel region pixel region, the first drain electrode 126a may be connected to the first drain electrode plate 150a and the second drain electrode 126b may be connected to the second drain electrode plate 150b. Preferably, the first and second drain electrode plates 150a and 150b are made in a substantially rectangular shape. However, this exemplary embodiment is not limited thereto. The first and second drain electrode plates 150a and 150b may be formed in the shape of a circle, as shown in FIG. 9. Also, the first and second drain electrode plates 150a and 150b can also be formed in the shape of a polygon, the shape of a semicircle, the shape of a half ellipse, or the shape of an ellipse, other than the shape of a circle.

According to this exemplary embodiment, it is possible to prevent the damage of elements due to static electricity and to perform alternate driving capable of applying different voltages to adjacent first and second pixel electrodes 170a and 170b in a pixel region.

As described above, since the first and second drain electrodes 126a and 126b are connected to the first and second drain electrode plates 150a and 150b, respectively, it is possible to prevent damage to the thin film transistors 120a and 120b from static discharge. The drain electrodes 126a and 126b of the thin film transistors 120a and 120b are positioned in the form of floating metal wiring line that is not connected to the external wiring line during the process of manufacturing the display device. Therefore, when the drain electrodes are connected to an external wiring line or when the manufacturing process (for example, a plasma treatment process) is performed, charges are stored in the floating metal. When the amount of stored charges exceeds the amount of charges (that is, a threshold) that the floating metal can store, static discharge may occur that breaks down the insulation between the floating metal and a metal adjacent to the floating metal. The break-down of insulation damages the elements.

When the size of the floating metal is small, the amount of charges that the floating metal can store is small and thus static discharge may occur. However, when the size of the floating metal is large, the amount of charges that the floating metal can store is large, and thus it is possible to prevent static discharge. Therefore, in this exemplary embodiment, by increasing the contact areas of the drain electrodes 126a and 126b of the thin film transistors 120a and 120b with the drain electrode plates 150a and 150b, it is possible to prevent static discharge due to the drain electrodes 126a and 126b.

In this exemplary embodiment, in one pixel region, two pixel electrodes 170a and 170b are provided and are charged with different pixel signals. The first and second thin film transistors 120a and 120b supply, to the first and second pixel electrodes 170a and 170b, first and second pixel signals (grayscale voltages) which are supplied to the first and second data lines 130a and 130b in response to a signal supplied to the gate line 110, respectively. That is, as described above, in one pixel region, the first pixel electrode 170a is charged with the first pixel signal of the first data line 130a through the first thin film transistor 120a, and the second pixel electrode 170b is charged with the second pixel signal of the second data line 130b through the second thin film transistor 120b. In another pixel region adjacent to the one pixel region, the first pixel electrode 170a is charged with the second pixel signal of the second data line 130b through the second thin film transistor 120b, and the second pixel electrode 170b is charged with the first pixel signal of the first data line 130a through the first thin film transistor 120a. In this way, the display device can be alternately driven.

An insulating protection film 160 is formed on the first and second thin film transistors 120a and 120b and the first and second data lines 130a and 130b. The protection film 160 may be formed of an inorganic material, such as silicon nitride or silicon oxide, or an organic material having a low dielectric constant. The first and second contact holes 161 and 162 are formed in the insulating protection film 160 to expose portions of the first and second drain electrode plates 150a and 150b.

The first and second pixel electrodes 170a and 170b are formed on the protection film 160.

The first pixel electrode 170a has the shape of a bent band and substantially has mirror symmetry with respect to a line bisecting the pixel region into upper and lower equal parts. As shown in FIG. 1, the first pixel electrode 170a includes a first band extending from an upper left portion of the pixel region to a center right region of the pixel region, a second band extending from a lower left portion of the pixel region to the center right region of the pixel region, and a third band connecting the first and the second bands in the center right region of the pixel region. The first pixel electrode 170a is made in a substantial V shape. It is preferable that the angle of inclination of each of the first and second bands relative to the gate line 110 be about 45°. However, the angle of inclination is not limited thereto, but it may be variable.

The second pixel electrode 170b is made in a substantial V shape surrounding the first pixel electrode 170a and has mirror symmetry. The second pixel electrode 170b includes a first plate provided between the first and second bands of the first pixel electrode 170a, a second plate provided in an upper region of the first band to be connected to the first plate, and a third plate provided in a lower region of the second band to be connected to the first and second plates.

As shown in FIGS. 1 and 9, the first drain electrode plate 150a is provided in the second band region of the first pixel electrode 170a and the second drain electrode plate 150b is provided in the first plate region of the second pixel electrode 170b. However, the invention is not limited thereto. The first drain electrode plate 150a may be provided in the first band region of the first pixel electrode 170a, as shown in FIG. 6. Also, the second drain electrode plate 150b may be provided in the third plate region of the second pixel electrode 170b as shown in FIG. 8.

The first and second pixel electrodes 170a and 170b are separated from each other, and preferably have a plurality of slit patterns 171 as a domain restricting unit for controlling the orientation of liquid crystal. However, the invention is not limited thereto. The first and second pixel electrodes 170a and 170b may have various domain restricting units.

The common electrode substrate 2000 includes: an insulating substrate 200 made of a transparent insulating material, such as glass; a plurality of red, green, and blue color filters 220 and a black matrix 210 formed on a lower surface of the insulating substrate 200 to prevent light leakage and light interference between adjacent pixel regions; and an overcoat film 230 made of an organic material on the color filters 220.

On the overcoat film 230, a common electrode 240 is formed of a transparent conductive material, such as ITO or IZO. The common electrode 240 is provided with a plurality of protrusion patterns 241 as shown in FIGS. 2 and 4 or a plurality of slit patterns 242 as shown in FIGS. 3 and 5. In this exemplary embodiment, as shown in FIG. 1, the plurality of protrusion patterns 241 or slit patterns 242 are formed at positions bisecting the first and second pixel electrodes 170a and 170b.

Slit patterns 171 of the first and second pixel electrodes 170a and 170b and the protrusion patterns 241 or the slit patterns 242 of the common electrode 240 serve as domain restricting units for dividing and orienting the liquid crystal. These domain restricting units may be provided in the first and second pixel electrodes 170a and 170b and/or the common electrode 240. First and second sub-pixel capacitors are provided between the first and second pixel electrodes 170a and 170b and the common electrode 240. In this way, it is possible to form a unit pixel having two sub-pixel capacitors in one pixel region.

The thin film transistor substrate 1000 and the common electrode substrate 2000 are bonded to each other with a liquid crystal layer interposed therebetween to form a basic panel of the display device according to the exemplary embodiment of the invention, in which the first and second sub-pixels are provided in one unit pixel. It is preferable that the display device has liquid crystal having negative type dielectric constant anisotropy between the upper and lower substrates and vertically orients the liquid crystal. However, the invention is not limited thereto. Elements, such as polarizing plates, a back light, and a compensating plate, may be disposed on both sides of the basic panel of the display device.

The operation of the display having a plurality of unit pixels each having the first and second sub-pixel capacitors in a corresponding pixel region as described above will be described below.

When first and second grayscale voltages are applied to the first and second pixel electrodes 170a and 170b in the unit pixel, potential difference occurs between the common electrode 240 to which a common voltage Vcom is applied and the first and second pixel electrodes 170a and 170b. The potential difference causes the liquid crystal positioned between the thin film transistor substrate 1000 and the common electrode substrate 2000 to be rotated by the dielectric constant anisotropy such that the amount of light incident from a light source (not shown) through the pixel electrodes 170a and 170b is controlled and the light is emitted toward the common electrode substrate 2000. The light emitted toward the common electrode substrate 2000 passes through the color filters 220 provided on the common electrode substrate 2000 such that desired colors are displayed.

The alternate driving (dot inversion driving) of the display device will be described below focusing on the application of grayscale signals to the first and second pixel electrodes 170a and 170b of the thin film transistor substrate 1000.

A gate turn-on voltage supplied from the outside is sequentially supplied to the plurality of gate lines 110 and a plurality of grayscale voltages are supplied to the first and second data lines 130a and 130b. When the gate turn-on voltage is applied to the gate line 110, a plurality of first and second thin film transistors 120a and 120b connected to the corresponding gate line 110 are turned on. Therefore, the first grayscale signal of the first data line 130a connected to the first thin film transistor 120a is applied to the first pixel electrode 170a or the second pixel electrode 170b connected to the first thin film transistor 120a. Also, the second grayscale signal of the second data line 130b connected to the second thin film transistor 120b is applied to the first pixel electrode 170a or the second pixel electrode 170b connected to the second thin film transistor 120b.

It will be more specifically described as follows. Two adjacent unit pixel region patterns are shown in FIG. 6. A pixel region pattern disposed on the left side of FIG. 6 is referred to as a first pixel region pattern, and the other pixel region pattern disposed on the right side of FIG. 6 is referred to as a second pixel region pattern.

When the gate turn-on voltage is applied to the gate line 110, the first and second thin film transistors 120a and 120b are turned on. Therefore, the first and second pixel electrodes 170a and 170b of the first pixel region pattern are electrically connected to the first and second data lines 130a and 130b, respectively. The first and second pixel electrodes 170a and 170b of the second pixel region pattern are electrically connected to the second and first data lines 130b and 130a, respectively. That is, the electrical connection relationship between the first and second electrodes 170a and 170b of the first pixel region pattern and the first and second data lines 130a and 130b is opposite to the electrical connection relationship between the first and second electrodes 170a and 170b of the second pixel region pattern and the first and second data lines 130a and 130b.

The display device performs line inversion driving, that is, driving for inverting the polarities of signals for neighboring data lines. When the frame frequency of the display device is higher than 60 Hz (for example, 120 Hz), the loading of the data lines increases and thus dot inversion driving is not practicable. However, in this exemplary embodiment, as described above, it is possible to obtain a dot inversion effect by changing the connection relationship between the first and second data lines 130a and 130b and the first and second pixel electrodes 170a and 170b in the neighboring pixel regions. Accordingly, it is possible to prevent a vertical line stain from being generated. As shown in FIG. 7, when the gate turn-on voltage is applied to a first gate line G1, a plurality of thin film transistors 120a and 120b connected to the first gate line G1 are turned on. Therefore, a positive first grayscale signal of the first D1-a of the first data lines is applied to the first pixel electrode 170a in the first pixel region, and a negative second grayscale signal of the first D1-b of the second data lines is applied to the second pixel electrode 170b in the first pixel region.

A positive first grayscale signal of the second D2-a of the first data lines is applied to the second pixel electrode 170b in the second pixel region, and a negative second grayscale signal of the second D2-b of the second data lines is applied to the first pixel electrode 170a in the second pixel region. A positive first grayscale signal of the third D3-a of the first data lines is applied to the first pixel electrode 170a in a third pixel region, and a negative second grayscale signal of the third D3-b of the second data lines is applied to the second pixel electrode 170b in the third pixel region.

Therefore, the first pixel electrode 170a in the first pixel region is charged with a positive voltage and the first pixel electrode 170a in the second pixel region adjacent to the first pixel region is charged with a negative voltage. Further, the second pixel electrode 170b in the first pixel region is charged with a negative voltage and the second pixel electrode 170b in the second pixel region adjacent to the first pixel region is charged with a positive voltage. As described above, the pixel electrodes 170a in neighboring pixel regions are charged with grayscale voltages having different voltage levels, and similarly, the pixel electrodes 170b in neighboring pixel regions are charged with grayscale voltages having different voltage levels. Therefore, it is possible to perform dot inversion driving, which makes it possible to prevent a vertical line stain from being generated.

Further, in this exemplary embodiment, since the first and second thin film transistors 120a and 120b are turned on or off at the same time, it is possible to simultaneously supply the first and second grayscale signals to the first and second pixel electrodes 170a and 170b during a time period of 1H. Therefore, even though the frame frequency increases, it is possible to ensure enough time to charge the first and second pixel electrodes 170a and 170b with the first and second grayscale voltages.

A method of forming a thin film transistor substrate for a display device according to an exemplary embodiment of the invention having the above-described structure and effects will now be described.

FIGS. 10 to 13 are views illustrating processes of forming a thin film transistor substrate according to an exemplary embodiment of the invention.

Figure 10:
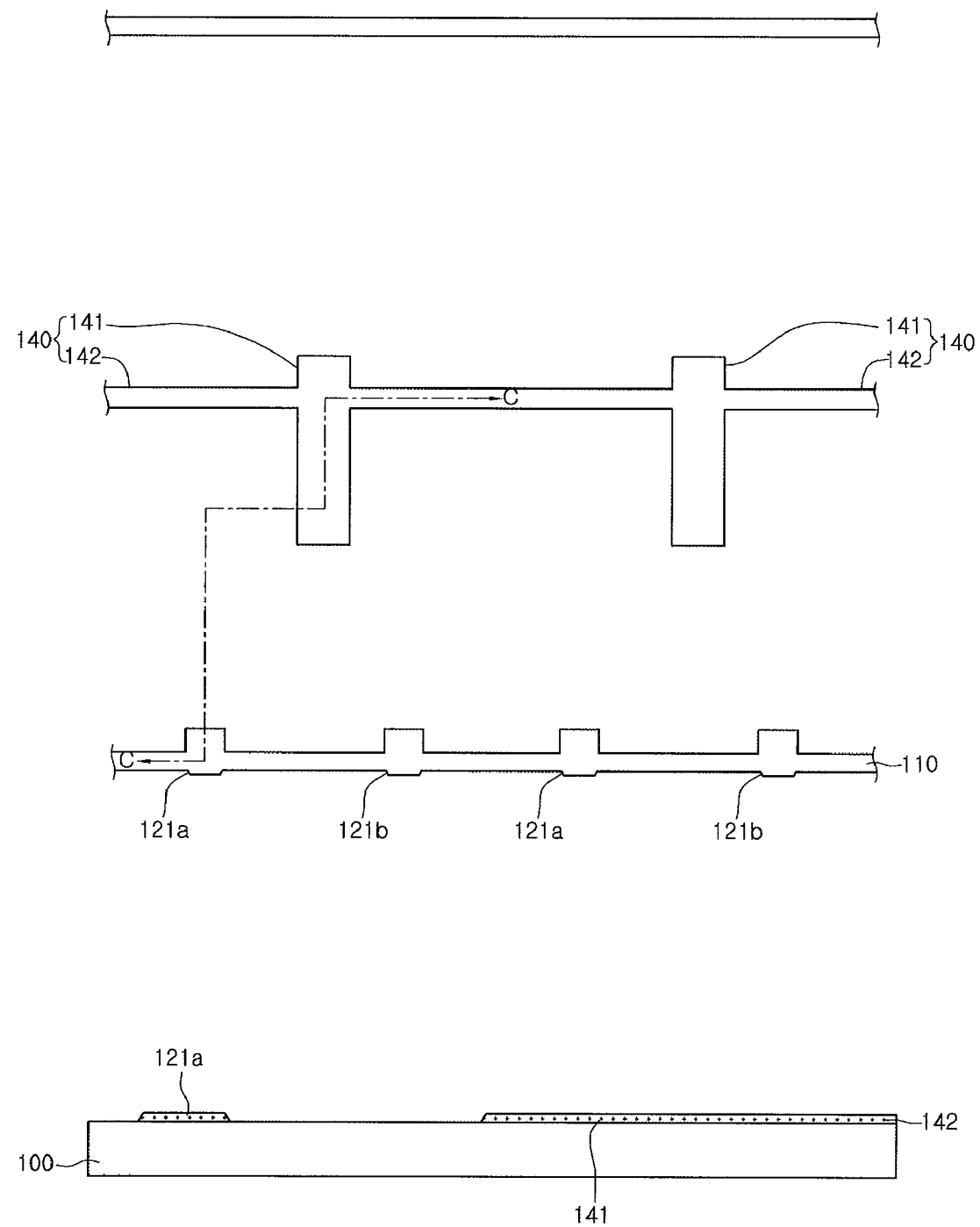
FIGS. 10 to 13 are views for explaining a process of manufacturing a thin film transistor substrate according to an exemplary embodiment of the invention.

Referring to FIG. 10, a first conductive film is formed on a transparent insulating substrate 100 and is patterned to form the gate lines 110, the first and second gate electrodes 121a and 121b, and the storage lines 140 including the storage electrode plates 141 and the storage electrode lines 142.

It is preferable that the first conductive film be formed of at least one of Cr, MoW, Cr/Al, Cu, Al(Nd), Mo/Al, Mo/Al(Nd), Cr/Al(Nd), and Mo/Al/Mo. However, the invention is not limited thereto. As described above, the first conductive film may be formed of at least one metal of Al, Nd, Ag, Cr, Ti, Ta, and Mo, or alloys thereof to have a single-layered or multi-layered structure. That is, the first conductive film may be formed in a double-layered or triple-layered structure including a metal layer formed of, for example, Cr, Ti, Ta, and Mo having excellent physical and chemical properties and an Al-based metal layer or an Ag-based metal layer having low specific resistance. After the first conductive film is formed on the entire surface of the insulating substrate, a photosensitive film is coated. Then, a lithography method using a first photosensitive film mask is performed to from a first photosensitive film mask pattern. An etching process using the first photosensitive film mask pattern as a mask for etching is performed to form the gate lines 10, the plurality of first and second gate electrodes 121a and 121b, and the storage lines 140 horizontally extending in correspondence with the gate lines 110, as shown in FIG. 10. Then, a predetermined strip process is performed to remove the first photosensitive film mask pattern.

Each of the gate lines 110 is formed so as to be laid across a plurality of pixel regions. The first and second gate electrodes 121a and 121b and the storage electrode plate 141 of the storage line 140 are formed in each pixel region. The storage electrode plates 141 provided in the individual pixel regions are connected through the storage electrode lines 142. The gate lines 110 and the storage electrode lines 142 extend in a horizontal direction. The storage electrode plates 141 are formed in the shape of a plate extending to intersect the extension direction of the storage electrode lines 142.

Figure 11:
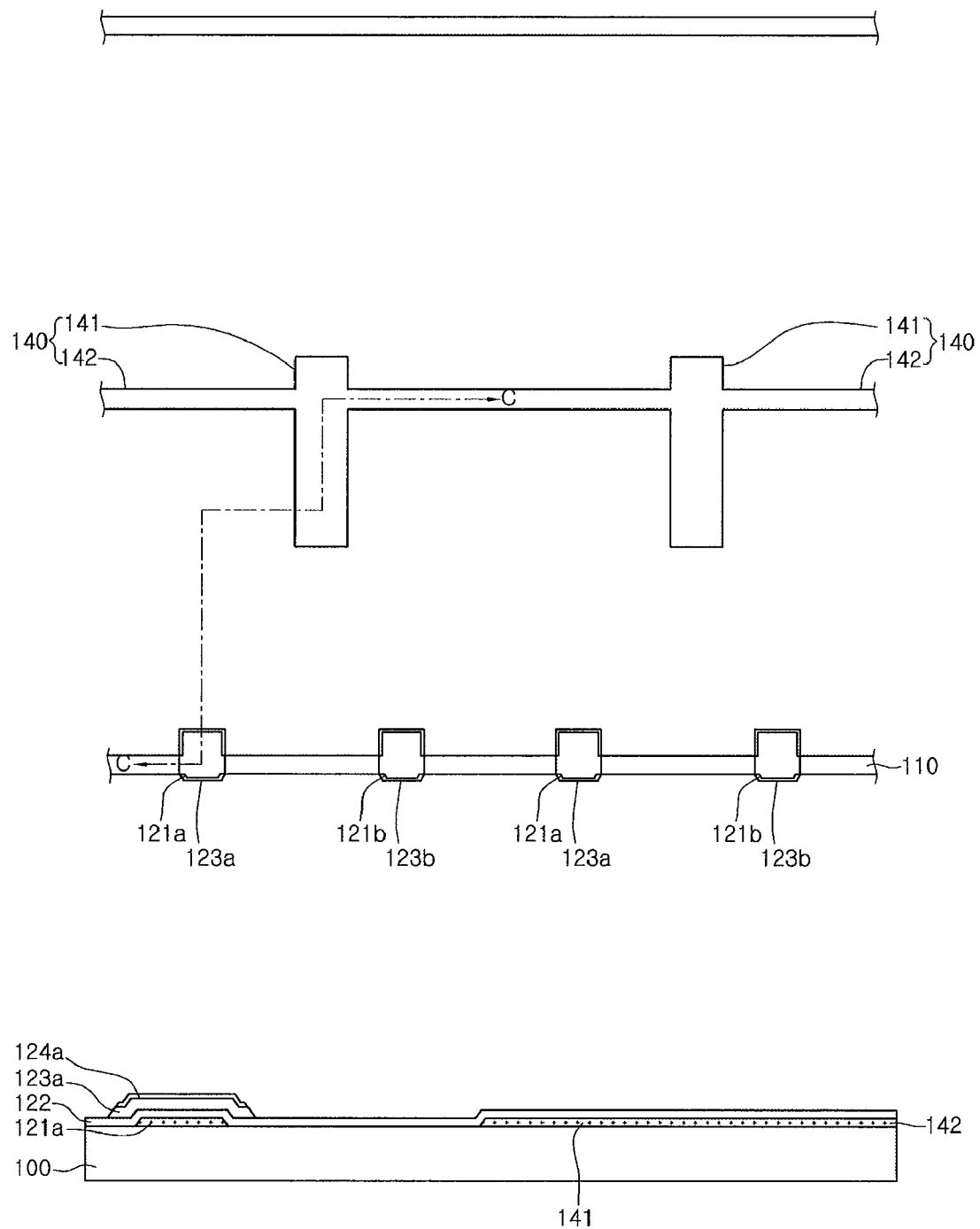

Referring to FIG. 11, a gate insulating film 122, a thin film for an active layer, and a thin film for an ohmic contact layer are sequentially formed on the substrate 100 having the gate lines 110 formed thereon, and the thin film for an active layer and the thin film for an ohmic contact layer are patterned to form an active area of the first and second thin film transistors including active layers 123a and 123b and ohmic contact layers 124a and 124b. It is preferable that the gate insulating film 122 be formed of an inorganic insulting material, such as silicon oxide or silicon nitride. An amorphous silicon layer is used as the thin film for an active layer and an amorphous silicon layer heavily doped with silicide or N-type impurities is used as the thin film for an ohmic contact layer.

That is, after the gate insulating film 122, the thin film for an active layer, and the thin film for an ohmic contact layer are sequentially formed on the substrate 100, a photosensitive film is coated on the thin film for an ohmic contact layer and a photolithography method using a second mask is performed to form a second photosensitive film mask pattern. An etching process in which the second photosensitive film mask pattern is used as a mask for etching and the gate insulating film 122 is set to an etching stop film is performed to form an active area including the ohmic contact layers 124a and 124b and the active layers 123a and 123b on the first and second electrodes 121a and 121b.

Figure 12:
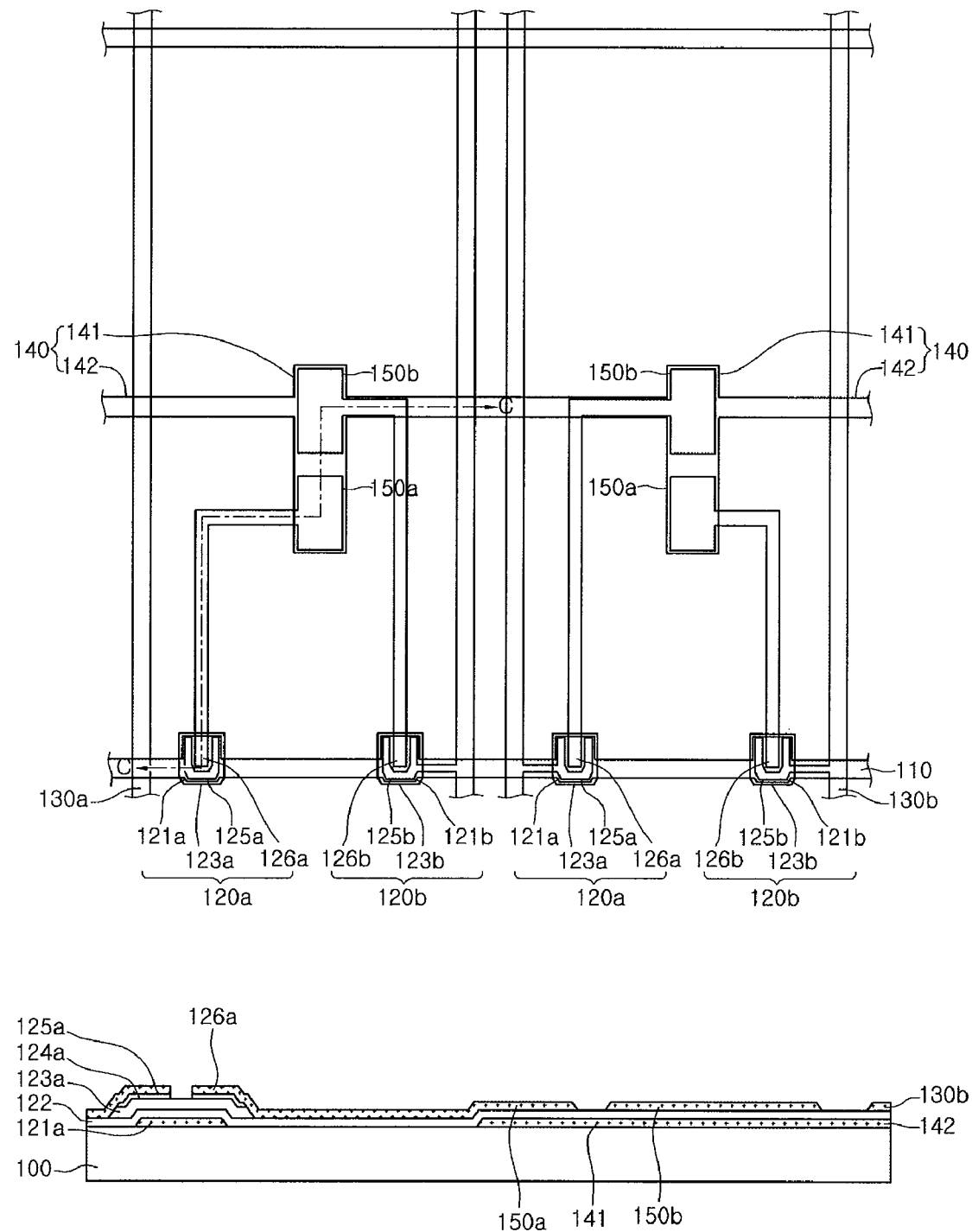

Referring to FIG. 12, after a second conductive film is formed on the overall structure having the active area of the first and second thin film transistors formed therein, a patterning process is performed to form the plurality of first and second data lines 130a and 130b, the plurality of first and second source electrodes 125a and 125b, the plurality of first and second drain electrodes 126a and 126b, and a plurality of first and second drain electrode plates 150a and 150b that overlap the storage electrode plates 141. In each unit pixel region, the first and second drain electrodes 126a and 126b are formed such that one of the first and second drain electrodes 126a and 126b is connected to one of the first and second drain electrode plates 150a and 150b and the other drain electrode is connected to the other of the first and second drain electrode plates 150a and 150b.

It is preferable that a single or multi-layered metal layer formed of at least one of Mo, Al, Cr, and Ti be used as the second conductive film. The second conductive film may be formed of the same material as the first conductive layer. Then, a photosensitive film is coated on the second conductive film and a lithography process using a mask is performed to form a third photosensitive film mask pattern. Next, an etching process using the third photosensitive film mask pattern as a mask for etching is performed to etch the second conductive film such that the first and second data lines 130a and 130b are formed to be disposed at both sides of each pixel region and be perpendicular to the gate lines 110 and the first and second source electrodes 125a and 125b and the first and second drain electrodes 126a and 126b are formed on the first and second gate electrodes 121a and 121b.

An etching process is performed to remove the ohmic contact layers 124a and 124b exposed between the source electrodes 125a and 125b and the drain electrodes 126a and 126b such that the first and second thin film transistors 120a and 120b having channels composed of the active layers 123a and 123b are formed between the source electrodes 125a and 125b and the drain electrodes 126a and 126b.

The first and second drain electrodes 126a and 126b extend from the upper sides of the first and second gate electrodes 121a and 121b to be connected to the first and second drain electrode plates 150a and 150b. A patterning process is performed such that the first and second drain electrode plates 150a and 150b are formed between virtual extension lines extending from the inner surfaces of the first and second gate electrodes 150a and 150b. The first and second drain electrode plates 150a and 150b may be formed between virtual extension lines extending in the extending direction of the first and second drain electrodes 126a and 126b extending from the upper sides of the first and second gate electrodes 121a and 121b. In this case, it is preferable that the first and second drain electrode plates 150a and 150b be disposed in the vertical direction. Alternatively, the first and second drain electrode plates 150a and 150b may be patterned such that a line connecting the centers of the first and second drain electrode plates 150a and 150b intersects the gate line 110.

Further, as described above, the first drain electrode plate 150a in one pixel region is connected to the first drain electrode 126a and the second drain electrode plate 150b in the one pixel region is connected to the second drain electrode 126b. Furthermore, the first drain electrode plate 150a in another pixel region adjacent to the one pixel region is connected to the second drain electrode 126b and the second drain electrode plate 150b in another pixel region is connected to the first drain electrode 126a. In the display device having the above-mentioned structure, in one of two neighboring pixel regions, the first drain electrode plate 150a is connected to the first drain electrode 126a and the second drain electrode plate 150b is connected to the second drain electrode 126b, and in the other pixel region, the first drain electrode plate 150a is connected to the second drain electrode 126b and the second drain electrode plate 150b is connected to the first drain electrode 126a. Therefore, the display device can perform dot inversion driving. Also, the drain electrodes 126a and 126b are connected to the drain electrode plates 150a and 150b having a large-sized plate shape, thereby preventing the elements from being damaged by static electricity. Further, it is possible to increase the electrostatic capacity of the storage capacitor by overlapping the drain electrode plates 150a and 150b with the storage electrode plate 141.

Figure 13:
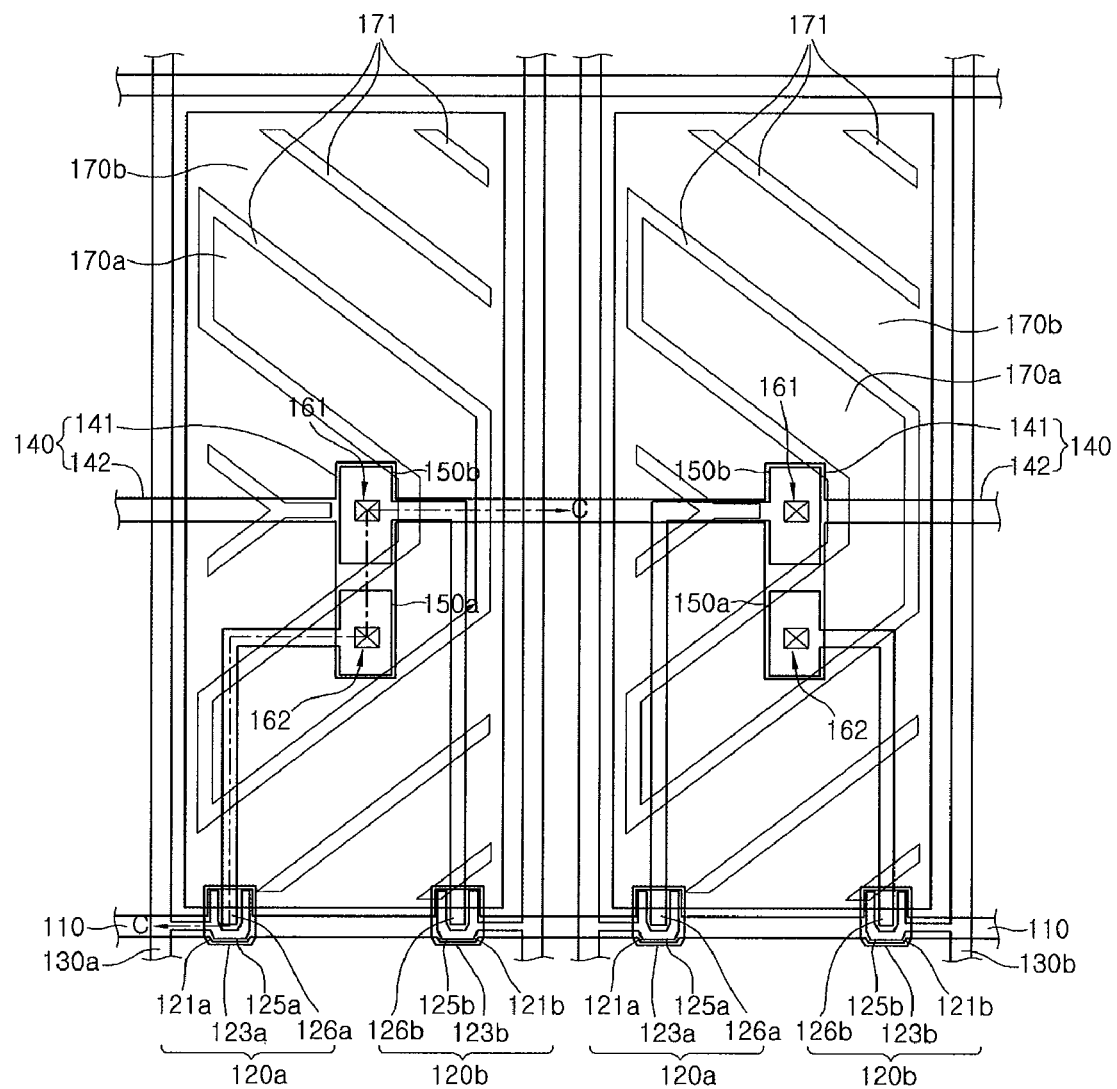
Figure 13:
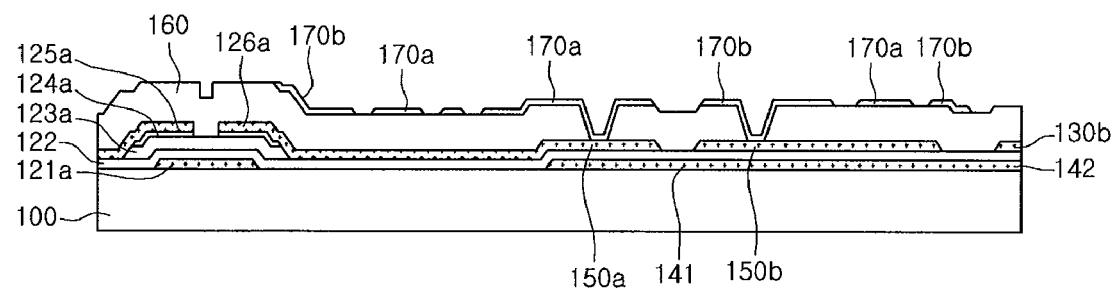

Referring to FIG. 13, a protection film 160 is formed on the substrate 100 on which the first and second thin film transistors 120a and 120b and the first and second drain electrode plates 150a and 150b connected to the first and second thin film transistors 120a and 120b are formed. Then, an etching process using a fourth photosensitive film mask pattern is performed to partially remove the protection film 160 such that first and second pixel contact holes 161 and 162 exposing portions of the first and second drain electrode plates 150a and 150b are formed.

Then, a third conductive film is formed on the protection film 160 having the first and second pixel contact holes 161 and 162 formed therein, and a patterning process using a fifth photosensitive film mask pattern (not shown) is performed to form the first and second pixel electrodes 170a and 170b having predetermined slit patterns 171.

It is preferable that a transparent conductive film containing ITO (Indium Tin Oxide) or IZO (Indium Zinc Oxide) be used as the third conductive film. The first pixel electrode 170a is connected to the first drain electrode plate 150a through the first pixel contact hole 161, and the second pixel electrode 170b is connected to the second drain electrode plate 150b through the second pixel contact hole 162.

Through the above-mentioned processes, two sub-pixels including the first and second pixel electrodes 170a and 170b electrically insulated from each other are formed in each unit pixel region defined by the gate lines 110 and the first and second data lines 130a and 130b.

After the first and second pixel electrodes 140a and 140b are formed as described above, a first orientation film (not shown) is formed on the overall structure. In this way, the lower substrate, that is, the thin film transistor substrate is manufactured.

The common electrode substrate is manufactured by sequentially forming, on the transparent insulating substrate, the black matrix, the color filters, the overcoat film, the protrusion pattern, the transparent common electrode, and a second orientation film (not shown). Then, the thin film transistor substrate and the common electrode substrate manufactured as described above are bonded to each other with spacers (not shown) interposed therebetween. Subsequently, vacuum injection method is used to inject a liquid crystal substance into a space formed by the spacers, thereby forming the liquid crystal layer. In this way, the liquid crystal display device according to the exemplary embodiment of the invention is manufactured.

In the above-described exemplary embodiment, the thin film transistor substrate is formed through a process using five masks. However, the invention is not limited thereto. The thin film transistor substrate may be formed through a process using six or more masks, or four or less masks.

As described above, according to the invention, the first and second drain electrode plates are formed to be connected to the first and second electrodes and the drain electrodes of the thin film transistors in the unit pixel regions where the first and second pixel electrodes are formed. Therefore, it is possible to prevent damage of the elements due to static discharge.

Further, according to the invention, in one of two neighboring pixel regions, the first thin film transistor is connected to the first drain electrode and the second thin film transistor is connected to the second drain electrode, and in the other pixel region, the first thin film transistor is connected to the second drain electrode and the second thin film transistor is connected to the first drain electrode. Therefore, it is possible to obtain a dot inversion driving effect by line inversion driving.

Furthermore, according to the invention, in each pixel region, the first and second drain electrode plates are disposed between extension lines of the first and second thin film transistors in the vertical direction. Therefore, it is possible to easily connect the first and second thin film transistors to the first or second drain electrode plates.

The invention has been described in detail in reference to the above exemplary embodiments and the accompanying drawings. However, the invention is not limited thereto but is limited by the appended claims. Therefore, it will be understood by those skilled in the art that various modifications and changes can be made without departing from the spirit and scope of the invention.

What is claimed is:

1. A thin film transistor substrate comprising:
   gate lines;
   first data lines and second data lines intersecting the gate lines, the first data lines and second data lines being alternately arranged;
   a first thin film transistor and a second thin film transistor formed in a unit pixel region defined by one gate line of the gate lines, one first data line of the data lines, and one second data line of the data lines, the first thin film transistor having a first source electrode extended from the first data line, a first drain electrode and a first gate electrode, and the second thin film transistor having a second source electrode extended from the second data line, a second drain electrode and a second gate electrode, respectively, the first gate electrode and the second gate electrode in the unit pixel region being extended from the same gate line;
   a first pixel electrode and a second pixel electrode formed in the unit pixel region;
   a first drain electrode plate-connected to the first pixel electrode and the first drain electrode-in the unit pixel region; and
   a second drain electrode plate connected to the second pixel electrode and the second drain electrode in the unit pixel region,
   wherein entire areas of the first and second drain electrode plates in the unit pixel region are formed between extension portions of the first and second drain electrodes, the extension portions being parallel to the first and second data lines.

2. The thin film transistor substrate of claim 1,
   wherein a center line connecting the centers of the first and second drain electrode plates in each unit pixel region intersects the gate lines.

3. The thin film transistor substrate of claim 1,
   wherein, in the unit pixel region, the storage electrode plate is formed between the extension portions of the first and second drain electrodes.

4. The thin film transistor substrate of claim 1,
   in another unit pixel region adjacent to the unit pixel region, another first drain electrode is connected to another second drain electrode plate, and another second drain electrode is connected to another first drain electrode plate.

5. A display device comprising:
   a plurality of unit pixels with each unit pixel including a first pixel capacitor having a first pixel electrode and a common electrode and a second pixel capacitor having a second pixel electrode and the common electrode;
   a first and second thin film transistors formed in each of the plurality of unit pixels, the first thin film transistor having a first drain electrode, and the second thin film transistor having a second drain electrode;
   a first drain electrode plate connected to the first pixel electrode and one of the drain electrodes in the unit pixel; and
   a second drain electrode plate connected to the second pixel electrode and the other of the drain electrodes in the unit pixel,
   wherein, in each of the unit pixels, entire areas of the first and second drain electrode plates are formed between an extension portion of the first drain electrode and an extension portion of the second drain electrode, the extension portions being parallel to a plurality of data lines, and
   wherein the first and second thin film transistors in each of the unit pixels are connected to the same gate line, the first thin film transistor is connected to a first data line, and the second thin film transistor is connected to a second data line.

6. The display device of claim 5, wherein, in each of the pixels, a center line connecting the centers of the first and second drain electrodes intersects the gate lines.

7. The display device of claim 5, further comprising:
   a plurality of storage electrode plates each of which partially overlaps the first and second drain electrodes in the corresponding unit pixel so as to form first and second storage capacitors.

8. The display device of claim 5,
   wherein, in one pixel region, the first drain electrode is connected to the first drain electrode plate and the second drain electrode is connected to the second drain electrode plate, and
   in another pixel region adjacent to the one pixel region, the first drain electrode is connected to the second drain electrode plate and the second drain electrode is connected to the first drain electrode plate.

9. A display device comprising:
   a plurality of gate lines;
   a plurality of first and second data lines, the first data lines and second data lines being alternately arranged;

a plurality of unit pixels each of which is formed among one gate line of the plurality of gate lines, one first data line of the plurality of first data lines, and one second data line of the plurality of second data lines, and includes a first pixel capacitor having a first pixel electrode and a common electrode, a second pixel capacitor having a second pixel electrode and the common electrode, a first storage capacitor having the first pixel electrode and a storage electrode plate, and a second storage capacitor having the second pixel electrode and the storage electrode plate, and first and second thin film transistors formed in each of the unit pixels, wherein an extension line of the storage electrode plate in a major axis direction intersects the gate lines, and the first pixel electrode is electrically connected to one of the first data line of the plurality of first data lines and the second data line of the plurality of second data lines, and the second pixel electrode is electrically connected to the other of the first data line and the second data line of the plurality of first and second data lines, and wherein the first and second thin film transistors in each of the unit pixels are connected to the same gate line, the first thin film transistor is connected to the first data line of the plurality of data lines, and the second thin film transistor is connected to the second data line of the plurality of data lines.

10. The display device of claim 9, wherein the first storage capacitor is formed between the first pixel electrode and the storage electrode plate and further includes a first drain electrode plate connected to the first pixel electrode, and the second storage capacitor is formed between the second pixel electrode and the storage electrode plate and further includes a second drain electrode plate connected to the second pixel electrode.

11. The display device of claim 10, further comprising:

the first thin film transistors each having a first drain electrode and second thin film transistors each having a second drain electrode, wherein, in each of the unit pixels, a portion of the first drain electrode extends to be connected to one of the first and second drain electrode plates, a portion of the second drain electrode extends to be connected to the other of the first and second drain electrode plates, and the first and second drain electrodes are formed between the extension portions of the first and second drain electrodes.

12. The display device of claim 10, wherein, in one pixel region, the first drain electrode is connected to the first drain electrode plate and the second drain electrode is connected to the second drain electrode plate, and in another pixel region adjacent to the one pixel region, the first drain electrode is connected to the second drain electrode plate and the second drain electrode is connected to the first drain electrode plate.

13. A method of manufacturing a display device, the method comprising:

forming on a transparent substrate, a plurality of gate lines, a plurality of first and second gate electrodes, and a plurality of storage electrode plates whose extension lines in a major axis directions intersect the gate lines;

forming a gate insulting film on the entire structure;

forming an active layer on the plurality of first and second gate electrodes;

forming a plurality of first and second data lines intersecting the gate lines, forming a first source electrode and a first drain electrode on each of the first gate electrodes, forming a second source electrode and a second drain electrode on each of the second gate electrodes, and forming a first drain electrode plate and a second drain electrode plate on each of the storage electrode plates such that the first drain electrode plate is connected to one of the first and second drain electrodes, the second drain electrode plate is connected to the other of the first and second drain electrodes, and a center line connecting the centers of the first and second drain electrode plates intersects the gate lines;

forming, on the entire structure, a protection film including a plurality of first pixel contact holes exposing portions of the first drain electrode plates and a plurality of second pixel contact holes exposing portions of the second drain electrode plates; and forming, on the protection film, a plurality of first pixel electrodes connected to the first drain electrode plates through the first pixel contact holes and a plurality of second pixel electrodes connected to the second drain electrode plates through the second pixel contact holes, wherein the first data lines and second data lines are alternately arranged, and a plurality of first and second thin film transistors are formed in unit pixel regions, each unit pixel defined by one gate line of the plurality of gate lines, one first data line of the plurality of data lines, and one second data line of the plurality of data lines, the first thin film transistors having the first source electrodes extended from the first data lines, the first drain electrodes and first gate electrodes, and the second thin film transistors having the second source electrodes extended from the second data lines, the second drain electrodes, and the second gate electrodes, the first gate electrodes and the second gate electrodes in each of the unit pixel regions being extended from the same gate line.

14. A thin film transistor substrate comprising:

a plurality of gate lines;

a plurality of first and second data lines intersecting the gate lines, the first data lines and second data lines being alternately arranged;

a first thin film transistor and a second thin film transistor formed in unit pixel regions, each pixel region defined by one gate line of the plurality of gate lines, one first data line of the plurality of first data lines, and one second data line of the plurality of second data lines, and the first thin film transistors having a first source electrode extended from the one first data line, a first drain electrode and a first gate electrode, and the second thin film transistor having a second source electrode extended from the one second data line, a second drain electrode and a second gate electrode, respectively, the first gate electrode and the second gate electrode in each of the unit pixel regions being extended from the same gate line;

a first pixel electrode and a second pixel electrode formed in each of the unit pixel regions;

a first drain electrode plate is connected to the first pixel electrode and one of the first and second drain electrodes in the unit pixel region; and a second drain electrode plate is connected to the second pixel electrode and the other of the first and second drain electrodes included in the unit pixel region, wherein, in each of the unit pixel regions, entire areas of the first and second drain electrode plates are formed between an extension portion of the first drain electrode and an extension portion of the second drain electrode, the extension portions being parallel to the first and second data lines, and a center line connecting the centers of the first and second drain electrode plates intersects the gate lines.

15. The thin film transistor substrate of claim 14, wherein, in each of the unit pixel regions, the first and second drain electrode plates are disposed in a vertical direction.

16. The thin film transistor substrate of claim 14, wherein, in one unit pixel region, the first drain electrode is connected to the first drain electrode plate and the second drain electrode is connected to the second drain electrode plate, and
in another unit pixel region adjacent to the one unit pixel region, the first drain electrode is connected to the second drain electrode plate and the second drain electrode is connected to the first drain electrode plate.

17. The thin film transistor substrate of claim 14, further comprising:
a plurality of storage electrode plates each of which extends in a vertical direction to partially overlap the first and second drain electrode plates in each unit pixel region.

* * * * *